(12) United States Patent
Ghidini

(10) Patent No.: US 7,416,327 B2
(45) Date of Patent: Aug. 26, 2008

(54) FOAMING DEVICE ADAPTABLE FOR THE PREPARATION OF COFFEE AND MILK OR CAPPUCCINOS OR SIMILAR DRINKS AND THAT CAN BE ASSEMBLED AT HOME

(75) Inventor: Tiziano Ghidini, Lumezzane BS (IT)

(73) Assignee: Beniamino Holding S.r.l., Lumezzane S.A. BS (IT)

( * ) Notice: Subject to any disclaimer, the term of this patent is extended or adjusted under 35 U.S.C. 154(b) by 443 days.

(21) Appl. No.: 11/188,341

(22) Filed: Jul. 25, 2005

(65) Prior Publication Data
US 2006/0021512 A1 Feb. 2, 2006

(30) Foreign Application Priority Data
Jul. 30, 2004 (IT) .......................... MI20040371 U

(51) Int. Cl.
*B01F 11/00* (2006.01)
*B01F 7/16* (2006.01)
(52) U.S. Cl. ................. 366/242; 366/256; 366/333; 366/347
(58) Field of Classification Search ............... 366/333, 366/334, 332, 605, 242, 255, 256, 257, 258, 366/259, 260, 317, 316, 315, 347; 215/319; 220/287, 790, 802
See application file for complete search history.

(56) References Cited

U.S. PATENT DOCUMENTS

| | | | | |
|---|---|---|---|---|
| 893,469 A * | 7/1908 | Essmuller | ..................... | 215/319 |
| 1,762,353 A * | 6/1930 | Robinson | ..................... | 366/256 |
| 1,836,026 A * | 12/1931 | Helle | ..................... | 366/256 |
| 2,166,437 A * | 7/1939 | Howie et al. | ..................... | 366/96 |
| 2,636,636 A * | 4/1953 | Smith | ..................... | 220/369 |
| 2,726,071 A * | 12/1955 | Bernhardt | ..................... | 366/256 |
| 2,736,536 A * | 2/1956 | Banowitz | ..................... | 366/248 |
| 2,760,672 A * | 8/1956 | Cronheim | ..................... | 220/287 |
| D181,143 S * | 10/1957 | Gundelfinger | ..................... | D7/376 |
| 3,141,567 A * | 7/1964 | Schearer | ..................... | 220/287 |
| 3,606,074 A * | 9/1971 | Hayes | ..................... | 220/212 |
| 3,655,089 A * | 4/1972 | Tower | ..................... | 220/287 |
| 4,150,763 A * | 4/1979 | Simpson | ..................... | 220/701 |
| 4,198,040 A * | 4/1980 | Colasent | ..................... | 220/254.4 |
| 4,946,286 A * | 8/1990 | Purkapile | ..................... | 366/247 |
| 5,284,389 A * | 2/1994 | Lumsden | ..................... | 366/256 |
| 5,580,169 A * | 12/1996 | Ghidini | ..................... | 366/256 |

(Continued)

*Primary Examiner*—Tony G Soohoo
(74) *Attorney, Agent, or Firm*—McGlew and Tuttle, P.C.

(57) ABSTRACT

A foaming device for the preparation of coffee and milk, cappuccinos or similar drinks including a cover designed to close the top of a virtually cylindrical container of the drink and a disk movable axially inside the container during use of the device with the disk being equipped with at least one mesh portion for emulsion of the air in the liquid and being fastened transversely to a rod running axially in a hole in the cover and protruding above it to be grasped manually. The device is characterized in that said cover includes at least two concentric annular grooves designed to engage with the upper edge of containers of different diameters to realize closing of the container with there being present a flexible circumferential portion that extends from the edge of the disk towards the outside to cover the opening that is created between the disk edge and the internal wall of the container when the device is used with containers of greater diameter.

20 Claims, 3 Drawing Sheets

U.S. PATENT DOCUMENTS

| | | | |
|---|---|---|---|
| 5,695,282 A * | 12/1997 | Hess | 366/256 |
| 5,780,087 A * | 7/1998 | Brady | 426/474 |
| 6,095,676 A * | 8/2000 | Kuan | 366/256 |
| 6,105,811 A * | 8/2000 | Alfred | 220/369 |
| 6,200,015 B1 * | 3/2001 | Gartz et al. | 366/256 |
| RE37,137 E * | 4/2001 | Ghidini | 366/256 |
| 6,231,226 B1 * | 5/2001 | Neidigh | 366/256 |
| D539,604 S * | 4/2007 | Chan | D7/391 |
| 2002/0031047 A1 * | 3/2002 | Fromm | 366/260 |
| 2006/0209630 A1 * | 9/2006 | Brown et al. | 366/342 |

* cited by examiner

FOAMING DEVICE ADAPTABLE FOR THE PREPARATION OF COFFEE AND MILK OR CAPPUCCINOS OR SIMILAR DRINKS AND THAT CAN BE ASSEMBLED AT HOME

BACKGROUND OF THE INVENTION

1. Field of the Invention

This invention relates to a foaming device for the preparation of cappuccinos or similar drinks that would be adaptable to use with different sized containers of the drink and especially for the classical ceramic or porcelain mugs.

2. State of the Prior Art

In recent years there have been proposed foaming devices to be used in household environments for the preparation of cappuccinos or similar drinks. Said devices typically include a drink container in which a disk with horizontal mesh can move vertically to form the milk cream desired in the drink. The disk is fastened to a rod that runs axially in a hole made in a closing cover of the container. The rod protrudes at the top from the container closing cover and can be grasped manually to move the mesh disk repeatedly up and down and vice versa. The disk is formed with a mesh which, when traversed by the liquid inside the container, permits forming the desired foam (or cream). When the liquid passes through the mesh some air particles remain imprisoned in the liquid and originate a foam (or cream) that can persist as long as 30 minutes. It is noted that the disk must be received with a small radial play inside the container so that the liquid of the drink is forced to pass through the mesh by its larger part.

Prior art foaming devices have allowed preparing cappuccinos or similar drinks with extreme ease even in household environments with no need of acquiring cumbersome and costly machines like those that are generally used in bars or restaurants.

Such devices, however, are suited to functioning only when the drink which it is desired to treat is poured into the purposeful container, which constitutes an integral and irreplaceable part of the foaming device. If it were desired to prepare a cappuccino or similar drink directly inside any cylindrical glass (or mug) with different diameters the cover as well as the mesh disk that might be used only in combination with a purposely made container would be found poorly adaptable. Indeed, the container must be sized so as to be closed firmly by the cover and must present an internal diameter little greater than the diameter of the mesh disk.

Prior art foaming devices are also quite cumbersome in selling and transport operations, because a specific container of appropriate size must be coupled to each cover. Further than requiring a great deal of space on the means of transport and in the shops and warehouses, such cumbersome devices also require an expensive packaging that can appreciably affect the final price of the product.

The general purpose of this invention is to remedy the above mentioned shortcomings by making available a foaming device with simple and economical structure that can be used for preparing drinks directly in containers of different diameters.

Another purpose of this invention is to make available a foaming device having more limited space occupied compared with the prior art devices and that can be packed in a more economical and advantageous manner since it is sold disassembled to then be assembled at home by the user.

SUMMARY OF THE INVENTION

In view of this purpose it was sought to provide in accordance with this invention a foaming device for the preparation of coffee and milk, cappuccinos or similar drinks and including a cover designed to close the top of a virtually cylindrical container of the drink and a disk movable axially inside the container during use of the device with the disk being equipped with at least one mesh portion for emulsion of the air in the liquid and being fastened transversely to a rod running axially in a hole in the cover and protruding above it to be grasped manually and characterized in that said cover includes at least two virtually concentric annular grooves designed to engage with the upper edge of containers of different diameters to realize closing of the container with there being a flexible circumferential portion that extends from the edge of the disk outward to cover at least partly the opening that is created between the disk edge and the internal wall of the container when the device is used with containers of greater diameter.

BRIEF DESCRIPTION OF THE DRAWINGS

To clarify the explanation of the innovative principles of this invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
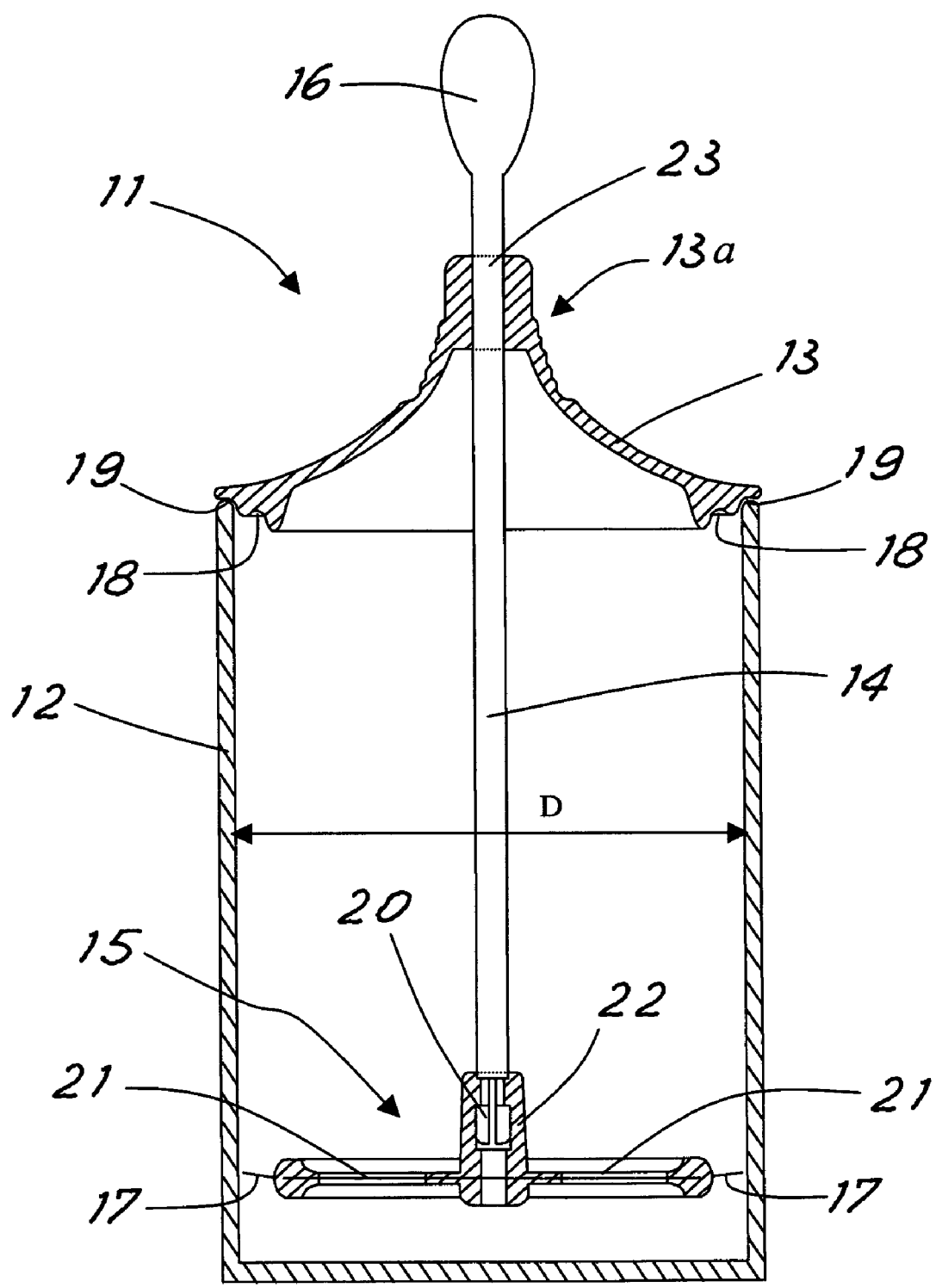
FIG. 1 shows a side cross section view of a foaming device applied to a container of a certain diameter.

With reference to the figures, FIG. 1 shows a foaming device 11 for the preparation of cappuccinos or similar drinks realized in accordance with this invention. The foaming device 11 is designed to be applied to cylindrical containers of different diameters and, in the example of FIG. 1, is applied to a cylindrical container 12 of diameter D. It is noted that by diameter D is intended for brevity the mean between the outside diameter and the inside diameter of the container. The container 12 could be any glass or mug of ceramic, porcelain or glass generally used for drinking milk, coffee, cappuccinos, milk and coffee or even tea and ideal for heating the milk in the microwave oven. It is noted that these types of containers often are not perfectly cylindrical inside but have slightly varying diameters.

The foaming device 11 includes a cover 13 designed to close the container 12 at the top during operation of the device. At its center of symmetry the cover 13 is provided with a hole 23 in which the vertical rod 14 runs axially.

The rod 14 protrudes above from the cover 13 and a knob 16 is created at its top end. The knob 16 is designed to be grasped manually by the user of the device for moving the rod 14 up and down and vice versa in accordance with the following description. Advantageously the knob 16 could be formed in a single piece with the rod 14 but could also be formed in a separate piece and engaged in various ways on the top end of the rod 14.

Figure 3:
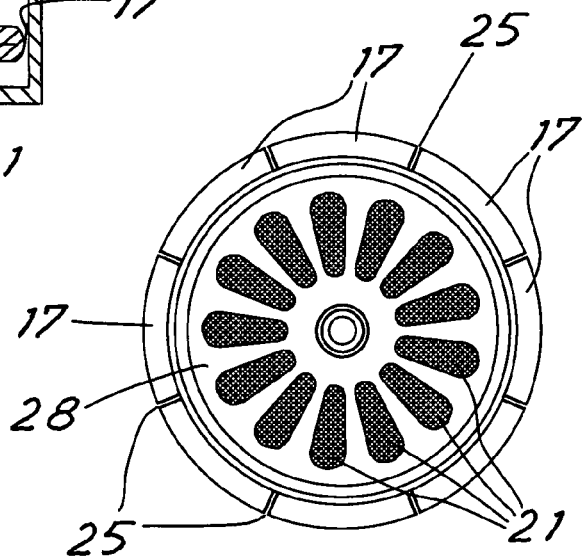
FIG. 3 shows a top view of the disk of the foaming device of the above figures.

A circular disk 15 is fastened to the lower end of the rod 14 perpendicular to the rod. When the foaming device 11 is applied to the container 12 the disk 15 is arranged parallel to the bottom of the container 12 so as to run axially to its interior. In accordance with that which is shown in FIG. 3 the disk includes a rigid body 28 in which are made a plurality of windows 21. Opposite the windows 21 is arranged a mesh (for example nylon) designed to realize emulsion of air in the liquid of the drink. The mesh is characterized by a grain such that when the liquid traverses the windows of the disk, small quantities of air remain imprisoned in the drink inducing the formation of foam (or milk cream) of persistent duration (up to 30 minutes).

Advantageously the mesh windows 21 have an elongated form and are arranged radially around the center of the disk 15 as shown in FIG. 3. Said mesh windows 21 could be for example a dozen.

In the center of the disk 15 there is a protrusion forming an engagement seat 22 in which the end 20 of the rod 14 goes to insert itself. Advantageously the end 20 is inserted in the seat with snap engagement. This contrivance allows realization of extremely simple assembly of the foaming device and allows anchoring the disk 15 to the rod 14 quite quickly.

A plurality of flexible fins 17 extend radially outward from the outer edge of the disk 15. In a preferred embodiment of this invention the flexible fins 17 are six in number separated by radial notches 25 to favor in a certain measure their flexure outside the plane of the disk 15. The fins 17 describe an annulus around the disk 15 and, as explained below, have the function o closing the opening between the edge of the disk 15 and the inner wall of the container 12 as the inside diameter of the glass varies. The fins 17 could be realized in rubber and be fastened to the body of the disk in accordance with the prior art.

In accordance with this invention the cover 13 is provided with two concentric circular grooves 18 and 19 designed to engage with the upper edge of the container 12 when the foaming device 11 is applied to it. Advantageously the lower edge of the cover 13 has a conical shape to facilitate centering on the container 12. The engagement between the grooves 18, 19 and the upper edge of the container allows holding the foaming device firmly in the correct position as regards the container while forcing the rod 14 to remain always virtually aligned with the axis of the cylindrical container. In an embodiment of this invention the cover 13 could be of rubbery material.

It is noted that the diameters of the two grooves (typically between 6 cm and 9 cm) correspond to the most common diameter of common glasses or mugs in use in household environments in the entire world.

In FIG. 1 as above-mentioned the foaming device is applied to a container 12 having diameter D. Said diameter D, which for example is 8 cm, corresponds to the diameter of the external groove 19. In this case, the disk 15 has considerably smaller diameter than the internal diameter of the container 12 and the space between the edge of the disk and the inner wall of the container is not negligible and is closed by the fins 17 that arrange themselves horizontally.

When it is desired to prepare a foamy cappuccino or a creamy milk and coffee, the container 12 is filled with milk or coffee or both and, as shown in the figure, the foaming device is applied to the container. Then by moving the disk repeatedly from below upward and vice versa the liquid traverses the mesh windows 21 until air particles remain imprisoned in the drink and allow formation of a persistent cream (or foam). In this case, the flexible portion remains in a virtually horizontal plane and forces the liquid to pass mostly through the mesh 21 to induce formation of the desired foam.

Once the cream is formed, the cover 13 is removed from the container 12 and the drink prepared can be enjoyed directly in the glass or can even be poured into other cups with the aid of the disk 15.

It is noted that the upper part 13a of the cover is elongated upward to allow grasping the cover when the drink is already prepared and it is desired to remove the foaming device 11 from the glass or to foam the milk cream.

Figure 2:
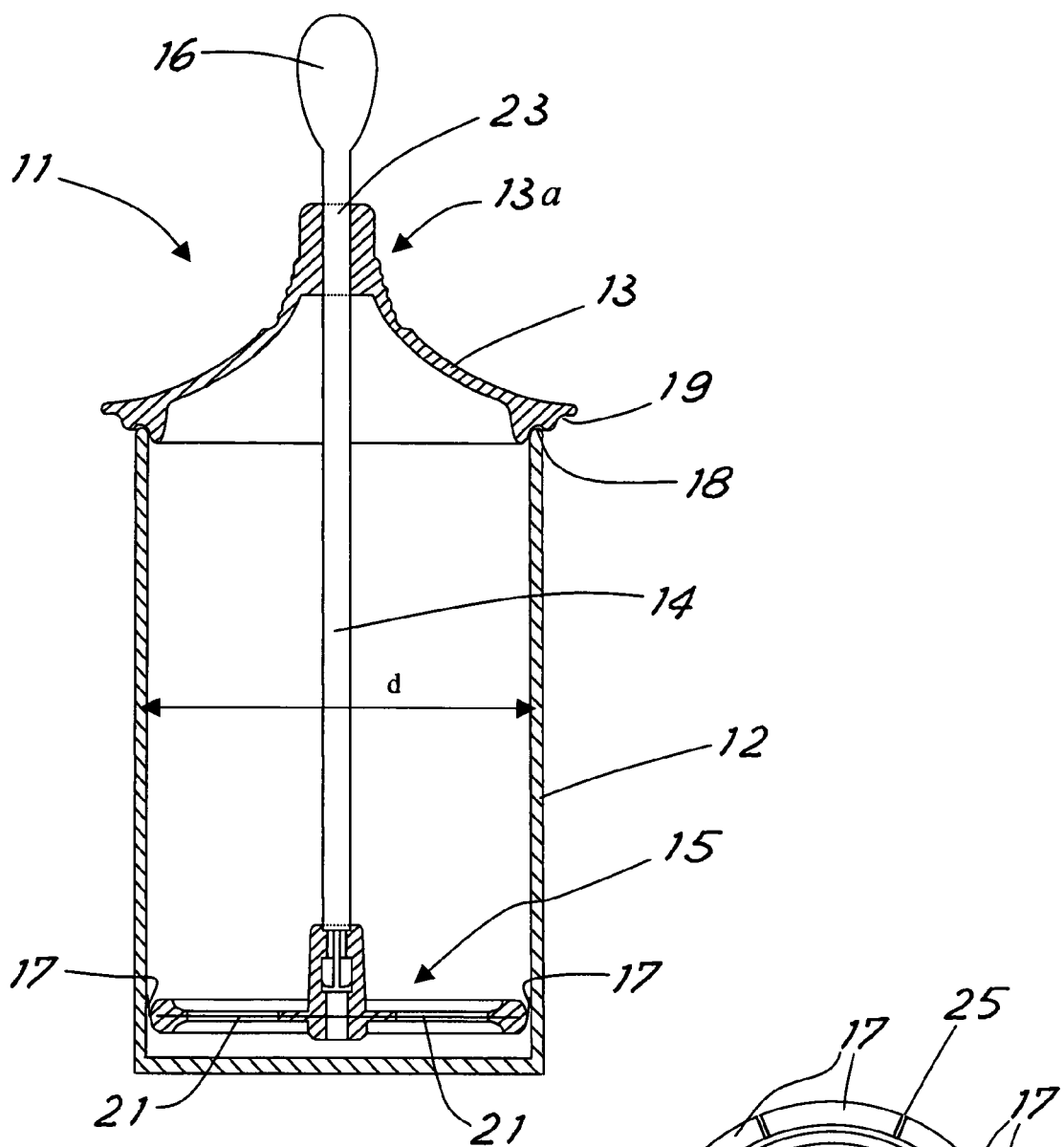
FIG. 2 shows a side cross section view of the foaming device of FIG. 1 applied to a container with a smaller diameter.

FIG. 2 shows the foaming device 11 applied this time to a container 32 having diameter d, which is less than diameter D of the container 12 of FIG. 1. This diameter d which for example could be 6.5 cm to 7 cm corresponds to the diameter of the inner groove 18 of the cover 13.

In this situation the cover engages firmly with the upper edge of the glass 32 opposite its groove 18. The disk 15 is received with little play in the container 32 enough that the fins 17 would not be necessary for closing the space between the outer edge of the disk 15 and the inner wall of the glass. This time, the fins 17, which are rubber, bend when entering into contact with the inner wall of the container without perceptibly obstructing the alternate vertical movement of the disk 15 during use of the device. It is noted advantageously that the thickness of the fins 17 is equal approximately to the difference between the radius of the groove 19 and the radius of the groove 18. The diameter of disc 15 is slightly less than the diameter of the inner groove 18. These contrivances allow having optimal operation of the foaming device with changing diameter of the container of the drink.

Figure 4:
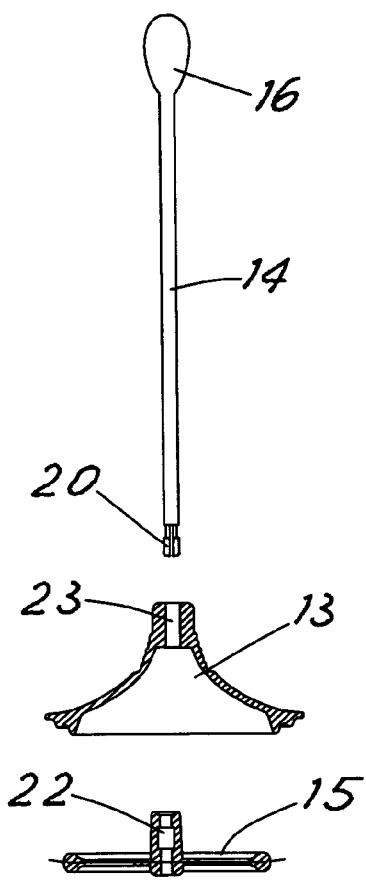
FIGS. 4, 5 and 6 show three different steps in the assembly of the device shown in the above figures.

FIG. 4 shows the three components making up the device before assembly and which can be easily made at home by the final user of the product (it is noted indeed that the device is preferably sold disassembled).

The three constituent parts are the rod 14 with the knob 16 made in the same piece at one of its ends, the cover 13 having a through hole 23 and the emulsion disk 15 provided with the engagement seat 22.

Figure 5:
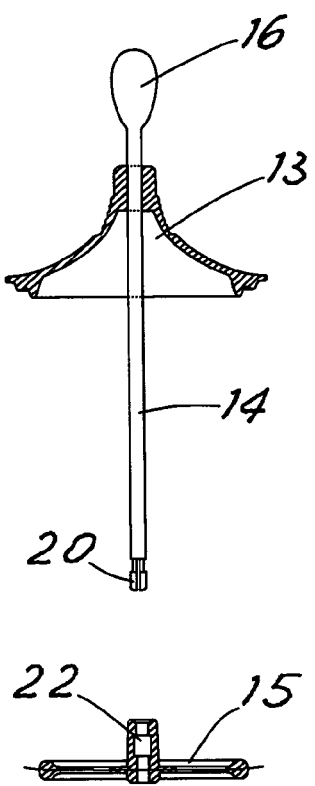

Assembly is very fast and simple. Indeed, it is sufficient at the beginning to insert the rod 14 in the hole 23 made in the cover as shown in FIG. 5. Then the end 20 of the rod is inserted with mere pressure by snapping into the engagement seat 22 in the disk 15. The end 20 indeed has two flexible teeth designed to engage permanently by snapping into the seat 22 to realize a prior art engagement.

Figure 6:
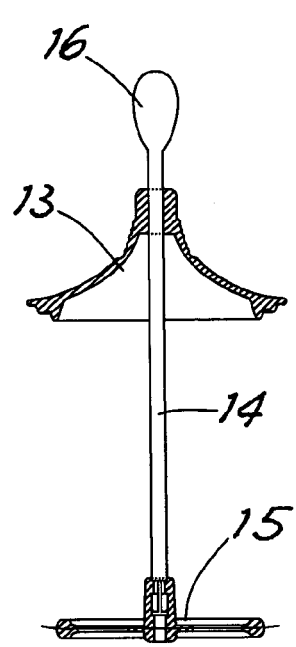

After engagement the foaming device is ready for use with the disk firmly fastened to the rod 14 as shown in FIG. 6. It is now clear that the preset purposes have been achieved. A foaming device for preparation of cappuccinos or similar drinks that is suited to use with glasses or mugs of different sizes is realized. This result allows preparation of the desired drink directly in any container with no need of using a container which is an integral part of the device and that is realized with predetermined dimensional characteristics in accordance with the prior art.

The device realized in accordance with this invention also has a series of advantages from the viewpoint of packing and space occupied by the product at sales points. Indeed, it being unnecessary to join to the foaming device a container realized purposely for its operation, it is possible to considerably reduce the space occupied by the product at sales points and also in transportation of the product. In particular, the product can be sold disassembled in three parts (cover, rod and mesh disk) to allow realization of a very thin and scarcely cumbersome package. The device can then be easily assembled at home thanks to the presence of the snap engagement between the rod and the mesh disk. It is clear that this fact makes merchandising of the device more economical and advantageous. In fact, packaging of the product presents a size smaller than the prior art packages. This fact helps make the device in accordance with this invention advantageous as compared with conventional foamers and allows using the mugs in a new procedure or use.

Naturally the above description of an embodiment applying the innovative principles of this invention is given by way of non-limiting example of said principles within the scope of the exclusive right claimed here. For example, the grooves on the cover of the device could even be more than two to allow further increasing the adaptability of the foamer.

The fins could also be many more that six in number and even up to seventy regularly spaced along the periphery of the disk and separated by radial notches. These fins, each of which occupies an arc of only a few degrees on the perimeter of the disk and presents a radially elongated form, could be molded in a single piece with the plastic disk body to present a thinness allowing them to bend in use when required.

What is claimed is:

1. A foaming device for the preparation of coffee and milk, cappuccinos or similar drinks, the device comprising:
   a cover designed to close a top of substantially cylindrical containers, each container containing a liquid, said cover defining a hole;
   a rod extending axially through said hole in said cover such that a portion of said rod extends to a position above said cover;
   a disk movable axially within one of the containers during use of the device, said disk being fastened transversely to said rod, said cover including at least two substantially concentric annular grooves for engaging an upper edge of one of said containers, said containers having varying diameters, said disk having at least one mesh portion for forming an emulsion of air in said liquid contained in one of said containers, said disk having a flexible circumferential portion extending in a radial direction from the edge of the disk such that said flexible circumferential portion covers at least partially an opening defined between said edge of said disk and an internal wall of one of the containers having a first diameter, said circumferential portion bending when said disk is located within one of the containers having a second diameter, said first diameter being greater than said second diameter.

2. A foaming device in accordance with claim 1, wherein said grooves are formed on a lower edge of the cover, said grooves having a conical shape to facilitate centering of the cover on one of said containers.

3. A foaming device in accordance with claim 1, wherein said circumferential portion includes a plurality of flexible fins separated by radial notches.

4. A foaming device in accordance with claim 3, wherein said flexible fins are six in number.

5. A foaming device in accordance with claim 3, wherein said disk is round and the flexible fins form a circular crown around said disk.

6. A foaming device in accordance with claim 5, wherein the thickness of said circular crown is approximately equal to the difference between the radius of the widest annular groove and the radius of the narrowest annular groove with the diameter of the disk being slightly less than the diameter of the narrowest groove.

7. A foaming device in accordance with claim 1, wherein said mesh portions are formed opposite a plurality of windows formed in a body of the disk with the windows being elongated and arranged radially around the center of the disk.

8. A foaming device in accordance with claim 7, wherein said circumferential portion includes a plurality of flexible fins separated by radial notches and said disk body forms the edge of the disk to which said flexible fins are fastened.

9. A foaming device in accordance with claim 1, wherein opposite the center of the body of the disk a seat designed to receive one end of said rod is formed to provide a snap engagement.

10. A foaming device in accordance with claim 1, wherein a graspable knob is formed in a single piece with the end of the rod protruding above said cover.

11. A foaming device in accordance with claim 1, wherein said cover has an elongated portion adjacent the hole in which the rod extends such that a user can hold said elongated portion when the drink has been prepared.

12. A foaming device for the preparation of coffee and milk, cappuccinos or similar drinks, the device comprising:
    a cover for closing an opening of one of a plurality of substantially cylindrical containers, each container containing a liquid, said cover defining a rod receiving space;
    a rod extending axially through said rod receiving space in said cover such that a portion of said rod extends to a spaced location from said cover;
    a disk connected to said rod such that said disk is movable in an axial direction when said cover is attached to one of said containers, said disk extending in a direction perpendicular to said rod, said cover defining at least a first substantially concentric annular groove for contacting an upper edge of one of the containers having a first diameter greater than a diameter of said disk and a second substantially concentric annular groove for contacting an upper edge of another one of the containers having a second diameter less than said diameter of said disk, said disk having at least one mesh portion for forming an emulsion of air in said liquid contained in one of said containers, said disk having a flexible circumferential portion extending in a radial direction from an edge of said disk, said circumferential portion partially covering an opening defined between said edge of said disk and an internal wall of one of the containers having said first diameter, said circumferential portion bending when said disk is located within one of said containers having said second diameter.

13. A foaming device in accordance with claim 12, wherein said circumferential portion includes a plurality of flexible fins separated by radial notches.

14. A foaming device in accordance with claim 13, wherein said flexible fins are six in number.

15. A foaming device in accordance with claim 13, wherein said disk is round and the flexible fins form a circular crown around said disk.

16. A foaming device in accordance with claim 15, wherein the thickness of said circular crown is approximately equal to the difference between the radius of the widest annular groove and the radius of the narrowest annular groove with the diameter of the disk being slightly less than the diameter of the narrowest groove.

17. A foaming device in accordance with claim 12, wherein said mesh portions are formed opposite a plurality of windows formed in a body of the disk with the windows being elongated and arranged radially around the center of the disk.

18. A foaming device in accordance with claim 17, wherein said circumferential portion includes a plurality of flexible fins separated by radial notches and said disk body forms the edge of the disk to which said flexible fins are fastened.

19. A foaming device for the preparation of coffee and milk, cappuccinos or similar drinks, the device comprising:

a cover for closing an opening of one of a plurality of substantially cylindrical containers having varying diameters, each container containing a liquid, said cover defining a rod receiving space;

a rod extending axially through said rod receiving space in said cover such that a portion of said rod extends to a position located above said cover;

a disk connected to said rod such that said disk is movable in an axial direction when said cover is attached to one of said containers, said disk extending in a direction perpendicular to said rod, said cover defining at least a first substantially concentric annular groove for contacting an upper edge of one of said containers and a second substantially concentric annular groove for contacting an upper edge of another one of said containers, said disk having at least one mesh portion for forming an emulsion of air in said liquid contained in one of the containers, said disk having a circumferential portion connected thereto, said circumferential portion being flexible such that said circumferential portion moves from a radial extending state to a bent state, said circumferential portion extending in a radial direction from an edge of said disk such that said circumferential portion partially covers an opening defined by said edge of said disk and an inner wall of one of the containers when said circumferential portion is in said radial extending state, said circumferential portion being in said bent state when said disk is located within one of said containers having a diameter that is less than a diameter of said disk with said circumferential portion.

20. A foaming device in accordance with claim 19, wherein said circumferential portion includes a plurality of flexible fins separated by radial notches.

* * * * *